(12) United States Patent
Yang et al.

(10) Patent No.: US 12,432,699 B2
(45) Date of Patent: Sep. 30, 2025

(54) BEAM INFORMATION DETERMINING METHOD, TERMINAL, AND NETWORK SIDE DEVICE

(71) Applicant: VIVO MOBILE COMMUNICATION CO., LTD., Guangdong (CN)

(72) Inventors: Yu Yang, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 562 days.

(21) Appl. No.: 17/874,460

(22) Filed: Jul. 27, 2022

(65) Prior Publication Data
US 2022/0369293 A1    Nov. 17, 2022

Related U.S. Application Data

(63) Continuation of application No. PCT/CN2021/074339, filed on Jan. 29, 2021.

(30) Foreign Application Priority Data

Feb. 4, 2020 (CN) .......................... 202010080101.X

(51) Int. Cl.
*H04W 72/02* (2009.01)
*H04L 5/00* (2006.01)
(Continued)

(52) U.S. Cl.
CPC .......... *H04W 72/02* (2013.01); *H04L 5/0051* (2013.01); *H04W 72/046* (2013.01)

(58) Field of Classification Search
CPC ... H04W 72/02; H04W 72/046; H04W 72/23; H04W 72/232; H04W 72/1268;
(Continued)

(56) References Cited

U.S. PATENT DOCUMENTS 11,166,172 B2 * 11/2021 Venugopal .......... H04W 72/046
11,356,222 B2    6/2022 Gao et al.
(Continued)

FOREIGN PATENT DOCUMENTS

CN    108092754 A    5/2018
CN    108633006 A    10/2018
(Continued)

OTHER PUBLICATIONS

Decision of Refusal regarding Japanese Patent Application No. 2022-547176, dated Jan. 10, 2024. Translation provided by Bohui Intellectual Property.
(Continued)

*Primary Examiner* — Candal Elpenord
(74) *Attorney, Agent, or Firm* — Harness, Dickey & Pierce, P.L.C.

(57) ABSTRACT

A beam information determining method includes: determining a candidate beam information pool of a first set, where the first set includes at least one downlink channel and at least one uplink channel, or the first set includes at least one channel and at least one reference signal; and the candidate beam information pool includes at least one piece of candidate beam information; and determining, based on the candidate beam information pool, beam information of at least one of a first channel or a first reference signal that are included in the first set.

20 Claims, 4 Drawing Sheets

(51) Int. Cl.
*H04W 72/04* (2023.01)
*H04W 72/044* (2023.01)

(58) Field of Classification Search
CPC ... H04W 72/1273; H04W 72/21; H04L 5/0051; H04L 5/0048; H04L 5/0025; H04L 5/0053; H04B 7/0619; H04B 7/0695; H04B 7/088; H04B 7/0456; H04B 7/0606; H04B 7/06952
USPC ............................................. 370/329–330
See application file for complete search history.

(56) References Cited

U.S. PATENT DOCUMENTS

| | | | |
|---|---|---|---|
| 11,412,531 | B2 | 8/2022 | Chen et al. |
| 2019/0306924 | A1 | 10/2019 | Zhang et al. |
| 2019/0394082 | A1* | 12/2019 | Cirik ................... H04W 76/28 |
| 2020/0383096 | A1 | 12/2020 | Yang et al. |
| 2021/0068123 | A1* | 3/2021 | Zhu ....................... H04L 43/16 |
| 2021/0120536 | A1 | 4/2021 | Gao et al. |
| 2021/0153040 | A1* | 5/2021 | Zhou ................... H04L 5/0023 |
| 2021/0274487 | A1 | 9/2021 | Matsumura et al. |
| 2021/0329575 | A1 | 10/2021 | Li |
| 2022/0225120 | A1* | 7/2022 | Matsumura ........... H04L 5/0023 |
| 2023/0006727 | A1* | 1/2023 | Jang ................... H04L 5/0051 |

FOREIGN PATENT DOCUMENTS

| | | | |
|---|---|---|---|
| CN | 109076364 | A | 12/2018 |
| CN | 109089322 | A | 12/2018 |
| CN | 109802787 | A | 5/2019 |
| CN | 110582118 | A | 12/2019 |
| WO | WO-2019097478 | A1 | 5/2019 |
| WO | WO-2019127199 | A1 | 7/2019 |
| WO | WO-2020012662 | A1 | 1/2020 |

OTHER PUBLICATIONS

First Office Action regarding Chinese Patent Application No. 202010080101.X, dated Sep. 1, 2022. Translation provided by Bohui Intellectual Property.

International Search Report and Written Opinion of the International Searching Authority regarding International Patent Application No. PCT/CN2021/074339, dated Apr. 22, 2021. Translation provided by Bohui Intellectual Property.

"Discussion on beam management," ZTE, Sanechips, 3GPP TSG RAN WG1 Meeting #90-bis, R1-1717424, dated Oct. 13, 2017.

First Office Action regarding Japanese Patent Application No. 2022-547176, dated Jul. 14, 2023. Translation provided by Bohui Intellectual Property.

Decision of Refusal regarding Japanese Patent Application No. 2022-547176, dated Jan. 10, 2024.

First Office Action regarding Indian Patent Application No. 202217042949, dated Feb. 3, 2023.

Supplementary European Search Report regarding European Patent Application No. 21749992.0-1206, dated Jun. 30, 2023.

"UL beam management for NR MIMO," ZTE, 3GPP TSG RAN WG1 Meeting #90, R1-1712299, dated Aug. 25, 2017.

"Views on beam recovery," NTT Docomo, 3GPP TSG RAN WG1 Meeting NR#3, R1-1716083, dated Sep. 21, 2017.

"Feature lead summary 1 for beam measurement and reporting," Ericsson, 3GPP TSG-RAN WG1 Meeting #93, R1-1807625, dated May 25, 2018.

First Office Action regarding Korean Patent Application No. 10-2022-7030568, dated Feb. 19, 2025. Translation provided by Bohui Intellectual Property.

"Enhancements on multi-TRP/panel transmission," NTT Docomo, Inc., 3GPP TSG RAN WG1 #99, R1-1912893, dated Nov. 18, 2019.

"Enhancements on Multi-TRP/Panel Transmission," Nokia, Nokia Shanghai Bell, 3GPP TSG RAN WG1 #99 Meeting, R1-1912719, dated Nov. 18, 2019.

\* cited by examiner

BEAM INFORMATION DETERMINING METHOD, TERMINAL, AND NETWORK SIDE DEVICE

CROSS-REFERENCE TO RELATED APPLICATIONS

This application is a Bypass Continuation Application of PCT/CN2021/074339 filed on Jan. 29, 2021, which claims priority to Chinese Patent Application No. 202010080101.X, filed on Feb. 4, 2020, which are incorporated herein by reference in their entirety.

TECHNICAL FIELD

The present disclosure relates to the field of communications technologies, and in particular, to a beam information determining method, a terminal, and a network side device.

BACKGROUND

At present, beam information of channels or reference signals is basically configured or indicated independently. There are a large quantity of channels or reference signals, and therefore relatively large signaling overheads are required for beam indication.

SUMMARY

The present disclosure provides a beam information determining method, a terminal, and a network side device.

According to a first aspect, an embodiment of the present disclosure provides a beam information determining method, applied to a terminal and including:
  determining a candidate beam information pool of a first set, where the first set includes at least one downlink channel and at least one uplink channel, or the first set includes at least one channel and at least one reference signal; and the candidate beam information pool includes at least one piece of candidate beam information; and
  determining, based on the candidate beam information pool, beam information of at least one of a first channel or a first reference signal that are included in the first set.

According to a second aspect, an embodiment of the present disclosure further provides a beam information determining method, applied to a network side device and including:
  configuring a candidate beam information pool of a first set, where the first set includes at least one downlink channel and at least one uplink channel, or the first set includes at least one channel and at least one reference signal; and the candidate beam information pool includes at least one piece of candidate beam information; and
  determining, based on the candidate beam information pool, beam information of at least one of a first channel or a first reference signal that are included in the first set.

According to a third aspect, an embodiment of the present disclosure further provides a beam information determining method, including:
  determining beam information of at least one of a fourth channel or a fourth reference signal; and
  determining, based on the beam information of at least one of the fourth channel or the fourth reference signal, beam information of at least one of a fifth channel or a fifth reference signal.

According to a fourth aspect, an embodiment of the present disclosure further provides a terminal, including:
  a first determining module, configured to determine a candidate beam information pool of a first set, where the first set includes at least one downlink channel and at least one uplink channel, or the first set includes at least one channel and at least one reference signal; and the candidate beam information pool includes at least one piece of candidate beam information; and
  a second determining module, configured to determine, based on the candidate beam information pool, beam information of at least one of a first channel or a first reference signal that are included in the first set.

According to a fifth aspect, an embodiment of the present disclosure further provides a terminal, including a memory, a processor, and a computer program stored in the memory and executable on the processor. When the computer program is executed by the processor, steps of the foregoing beam information determining method applied to the terminal are implemented.

According to a sixth aspect, an embodiment of the present disclosure further provides a network side device, including:
  a configuration module, configured to configure a candidate beam information pool of a first set, where the first set includes at least one downlink channel and at least one uplink channel, or the first set includes at least one channel and at least one reference signal; and the candidate beam information pool includes at least one piece of candidate beam information; and
  a third determining module, configured to determine, based on the candidate beam information pool, beam information of at least one of a first channel or a first reference signal that are included in the first set.

According to a seventh aspect, an embodiment of the present disclosure further provides a network side device, including a memory, a processor, and a computer program stored in the memory and executable on the processor. When the computer program is executed by the processor, steps of the beam information determining method applied to the network side device are implemented.

According to an eighth aspect, an embodiment of the present disclosure further provides a communications device, including:
  a fourth determining module, configured to determine beam information of at least one of a fourth channel or a fourth reference signal; and
  a fifth determining module, configured to determine, based on the beam information of at least one of the fourth channel or the fourth reference signal, beam information of at least one of a fifth channel or a fifth reference signal.

According to a ninth aspect, an embodiment of the present disclosure further provides a communications device, including a memory, a processor, and a computer program stored in the memory and executable on the processor. When the computer program is executed by the processor, steps of the beam information determining method are implemented.

According to a tenth aspect, an embodiment of the present disclosure further provides a non-transitory computer-readable storage medium, where a computer program is stored in the non-transitory computer-readable storage medium, and when the computer program is executed by a processor, steps of the foregoing beam information determining method are implemented.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings.

DETAILED DESCRIPTION OF EMBODIMENTS

Figure 1:
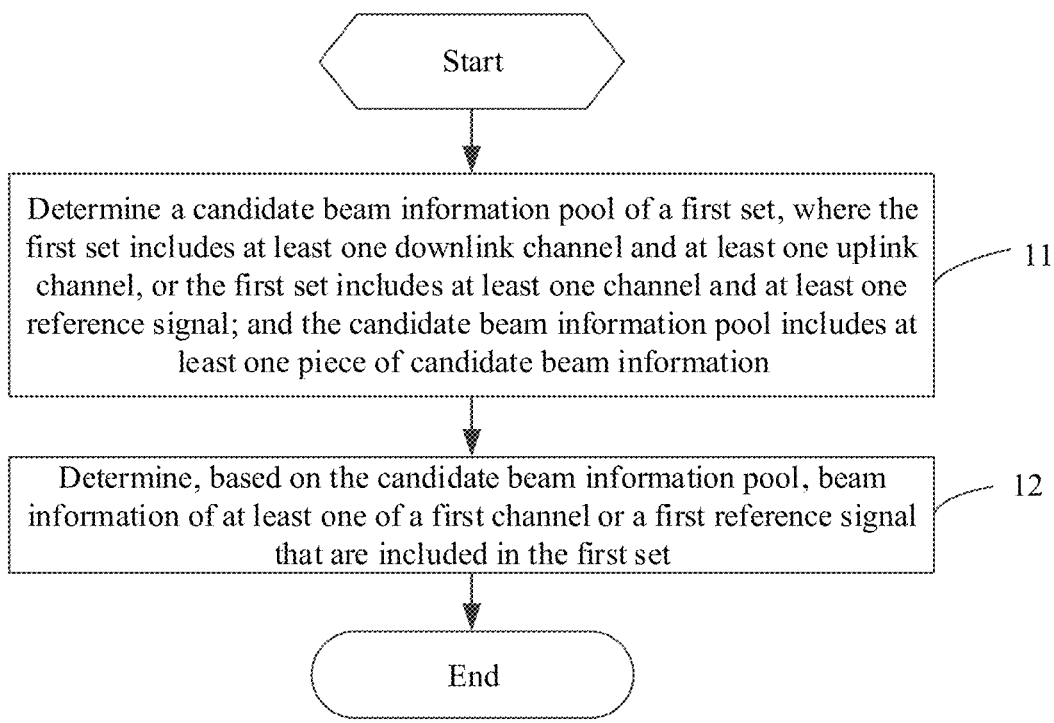
FIG. 1 is a first schematic flowchart of a beam information determining method according to an embodiment of the present disclosure.

Exemplary embodiments of the present disclosure will be described below in more detail with reference to the accompanying drawings. Although the accompanying drawings show exemplary embodiments of the present disclosure, it should be understood that the present disclosure may be implemented in various forms and should not be limited by the embodiments described herein. Instead, these embodiments are provided so that the present disclosure will be better understood, and the scope of the present disclosure can be conveyed to those skilled in the art.

In the specification and claims of this disclosure, the terms such as "first" and "second" are intended to distinguish between similar objects but do not necessarily indicate a specific order or sequence. It should be understood that the data used in this way is interchangeable in appropriate circumstances so that the embodiments of this disclosure described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

For description of the embodiments of the present disclosure, some concepts used in the following description are first described.

Multi-Antenna:

Radio access technology standards such as long term evolution (LTE)/long term evolution-advanced (LTE-A) are built based on multiple-input multiple-output (MIMO) and orthogonal frequency division multiplexing (OFDM) technologies. In the MIMO technology, spatial freedom obtained by the multi-antenna system is used to improve peak rate and system spectrum utilization.

Beam Measurement and Reporting:

Analog beamforming is based on full-bandwidth transmission, and an antenna element of each polarization direction on a panel of each high-frequency antenna array can transmit analog beams only in a time-division multiplexing manner. A beamforming weight of the analog beam is implemented by adjusting parameters of devices such as a phase shifter on a radio frequency front-end.

At present, in the academia and industrial fields, a polling manner is usually used for training of analog beamforming vectors, that is, the array element of each polarization direction of each antenna panel sends a training signal (that is, a candidate beamforming vector) sequentially at agreed times in a time-division multiplexing manner. A terminal feeds back a beam report after measurement, so that the network side can use the training signal to implement analog beam transmission for transmitting a next service. Content of the beam report generally includes identifiers of several optimal transmit beams and a measured received power of each transmit beam.

In beam measurement, the network configures a reference signal resource set that includes at least one reference signal resource, such as a synchronization signal block (SSB) resource or a channel state information reference signal (CSI-RS) resource. A terminal performs measurement on L1-reference signal received power (L1-RSRP) or L1 signal to interference plus noise ratio (L1-SINR) of each RS resource, and reports at least one optimal measurement result to the network. The report content includes a synchronization signal block resource indicator (SSBRI) or CSI-RS resource indicator (CRI), and L1-RSRP/L1-SINR. The report content reflects at least one optimal beam and its quality, so that the network determines a beam used for sending a channel or signal to user equipment (UE).

Beam Indication Mechanism:

After beam measurement and beam reporting, the network may perform beam indication for downlink and uplink channels or reference signals, so as to establish beam links between the network and the terminal, thereby implementing channel or reference signal transmission.

With regard to beam indication for physical downlink control channels (PDCCH), the network configures K transmission configuration indication (TCI) states for each control resource set (CORESET) by using radio resource control (RRC) signaling. When K>1, one TCI state is indicated or activated by a media access control (MAC) control element (CE); when K=1, no additional MAC CE command is required. During PDCCH monitoring, the UE uses the same Quasi-colocation (QCL) for all search spaces of a CORESET, that is, using the same TCI state for monitoring the PDCCH. A reference signal (for example, a periodic CSI-RS resource, a semi-persistent CSI-RS resource, or a synchronization signal block (SS block)) in the TCI state is spatially QCLed with a UE-specific physical downlink control channel (UE-specific PDCCH) demodulation reference signal (DMRS) port. According to the TCI state, the UE may learn which receive beam is used for receiving the PDCCH.

With regard to beam indication for physical downlink shared channels (PDSCH), the network configures M TCI states by using RRC signaling, activates $2^N$ TCI states by using a MAC CE command, and then notifies the TCI states by using an N-bit TCI field in downlink control information (DCI). The reference signal in the TCI state is QCLed with the DMRS port of the PDSCH to be scheduled. According to the TCI state, the UE may learn which receive beam is used for receiving the PDSCH.

With regard to beam indication for CSI-RS, when the CSI-RS type is a periodic CSI-RS, the network configures QCL information for the CSI-RS resource by using RRC signaling. When the CSI-RS type is a semi-persistent CSI-RS, the network indicates its QCL information when activating one CSI-RS resource from an RRC-configured CSI-RS resource set by using a MAC CE command. When the CSI-RS type is an aperiodic CSI-RS, the network configures QCL for a CSI-RS resource by using RRC signaling, and triggers the CSI-RS by using DCI.

With regard to beam indication for physical uplink control channels (PUCCH), the network configures spatial relation information for each PUCCH resource by using the PUCCH-SpatialRelationInfo parameter in RRC signaling. When a plurality of pieces of spatial relation information are configured for a PUCCH resource, one piece of the spatial relation information is indicated or activated by using a MAC CE. When only one piece of spatial relation information is configured for the PUCCH resource, no additional MAC CE command is required.

With regard to beam indication for physical uplink shared channels (PUSCH), spatial relation information of the PUSCH indicates that when DCI carried by a PDCCH schedules the PUSCH, each codepoint in the sounding reference signal resource indicator (SRI) field of the DCI indicates one SRI, and the SRI is used to indicate spatial relation information of the PUSCH.

With regard to beam indication for channel sounding reference signals (SRS), when an SRS type is a periodic SRS, the network configures spatial relation information for an SRS resource by using RRC signalling. When the SRS is semi-persistent SRS, the network activates, by using a MAC CE command, one of a group of spatial relation information configured by using RRC signaling. When an SRS type is aperiodic SRS, the network configures spatial relation information for an SRS resource by using RRC signaling. The foregoing beam information, spatial relation information, TCI state information, QCL information, and the like may all mean beam information. Downlink beam information may be usually represented by TCI state information and QCL information. Uplink beam information may be usually represented by using spatial relation information.

At present, relatively large signaling overheads are required for beam indication. For beam indication of a downlink channel or a reference signal, a QCLed source RS cannot be an SRS; however, for PUSCH beam indication, only an SRS can be used, which limits flexibility of beam indication.

Therefore, the embodiments of the present disclosure provide a beam information determining method, a terminal, and a network side device, so as to reduce signaling overheads for beam indication and also increase flexibility of beam indication.

Optionally, as shown in FIG. 1, an embodiment of the present disclosure provides a beam information determining method, applied to a terminal and including the following steps.

Step 11: Determine a candidate beam information pool of a first set, where the first set includes at least one downlink channel and at least one uplink channel, or the first set includes at least one channel and at least one reference signal; and the candidate beam information pool includes at least one piece of candidate beam information.

Optionally, the first set herein may be an explicit set, or may point to only at least one downlink channel and at least one uplink channel, or may point to only at least one channel and at least one reference signal, or may be directly replaced with at least one downlink channel and at least one uplink channel, or may be directly replaced with at least one channel and at least one reference signal. The first set may also be referred to as a target object.

For example, the first set may include a PDCCH and a PUCCH, or may include a PDSCH and a PUCCH, or may include a PUSCH and an SRS, or may include a PDSCH and an SRS, or may include a PDSCH and a PUSCH, or may include a PDCCH, a PDSCH, and a PUCCH; or the like, which is not specifically limited herein.

Optionally, the network side device may configure a candidate beam information pool (for example, a group of candidate TCI states) for a terminal by using RRC signaling, or may use a group of common TCI states activated by using a MAC CE. The terminal may determine the candidate beam information pool configured by the network side device or the group of activated TCI states to be the candidate beam information pool of the first set.

For example, the network side device configures a candidate beam information pool for the PDCCH by using RRC signaling, and the terminal uses the candidate beam information pool as the candidate beam information pool of the first set. For another example, the network side device configures a candidate beam information pool for the PDSCH by using RRC signaling, and the terminal uses the candidate beam information pool as the candidate beam information pool of the first set. For still another example, the network side device configures a candidate beam information pool for the PUCCH by using RRC signaling, and the terminal uses the candidate beam information pool as the candidate beam information pool of the first set. For still another example, the network side device configures a candidate beam information pool for the PDSCH by using RRC signaling, and then activates a group of candidate beam information in the candidate beam information pool by using a MAC CE, and the terminal determines the activated group of candidate beam information to be the candidate beam information pool of the first set.

Step 12: Determine, based on the candidate beam information pool, beam information of at least one of a first channel or a first reference signal that are included in the first set.

Optionally, the beam information of at least one of the first channel or the first reference signal in the first set is determined based on the determined candidate beam information pool of the first set.

In this embodiment of the present disclosure, the candidate beam information pool of the first set is determined, and the beam information of at least one of the first channel or the first reference signal that are included in the first set is determined based on the candidate beam information pool, where the first set includes at least one downlink channel and at least one uplink channel, or the first set includes at least one channel and at least one reference signal; and the candidate beam information pool includes at least one piece of candidate beam information. This can reduce signaling overheads for beam indication.

Optionally, in a case that the candidate beam information pool includes one piece of candidate beam information, the step 12 may include:

determining, based on the one piece of candidate beam information included in the candidate beam information pool, the beam information of at least one of the first channel or the first reference signal that are included in the first set.

Optionally, when there is only one piece of candidate beam information in the candidate beam information pool configured by the network side device, the candidate beam information may be determined as the beam information of at least one of the first channel or the first reference signal.

Optionally, in a case that the candidate beam information pool includes at least two pieces of candidate beam information, the step 12 may include:

receiving first indication information for at least one of the first channel or the first reference signal that are included in the first set, where the first indication information is used to indicate one piece of candidate beam information in the candidate beam information pool; and determining the beam information of at least one of the first channel or the first reference signal based on the first indication information.

Optionally, if the candidate beam information pool configured by the network side device includes two or more pieces of candidate beam information, the network side device sends the first indication information to the terminal, indicating that one of the two or more pieces of candidate beam information is the beam information of at least one of the first channel or the first reference signal.

Optionally, in a case that the first reference signal is a channel sounding reference signal SRS, the receiving first indication information for the first reference signal may include:

receiving first downlink control information DCI, where the first DCI carries the first indication information.

Optionally, the network side device sends the first DCI carrying the first indication information, that is, the network side device uses the DCI to indicate beam information of the SRS.

Optionally, the first DCI includes an SRS request field, and the SRS request field carries the first indication information.

For example, in a case that the candidate beam information pool is a group of TCI states (at least two TCI states) configured by the network side device by using RRC or activated for the PDSCH by using a MAC CE, an SRS request field in an existing signaling is extended, and one TCI state is selected from the candidate beam information pool to determine the beam information of the SRS, that is, the beam information of the SRS is one TCI state in the group of configured or activated TCI states.

Optionally, in a case that the first channel is a physical uplink shared channel PUSCH, the receiving first indication information for the first channel may include:

receiving second DCI, where the second DCI includes a channel state information reference signal resource indicator CRI field or a synchronization signal block resource indicator SSBRI field, and the CRI field or the SSBRI field carries the first indication information; where the CRI field or the SSBRI field is associated with a target SRS resource.

Optionally, the network side device sends the second DCI, that is, using the DCI to indicate the beam information. For example, in a case that the first channel is a PUSCH, a CRI or an SSBRI in the second DCI format 0_1 is used to indicate beam information of the PUSCH, and the indicated CRI/SSBRI is associated with the target SRS resource (for example, a CRI or an SSBRI associated with an SRS resource is used as a source RS in spatial relation information of the target SRS resource).

Optionally, in a case that the PUSCH is a codebook-based PUSCH, the second DCI does not include an SRI field, or a length of the SRI field is zero bits; or in a case that the PUSCH is a non-codebook-based PUSCH, the second DCI includes an SRI field or a length of the SRI field is greater than zero bits; and the SRI field is used for CSI measurement.

Optionally, a source reference signal of each piece of candidate beam information included in the candidate beam information pool is any one of a synchronization signal block SSB, a channel state information reference signal CSI-RS, and a channel sounding reference signal SRS.

Optionally, a source RS of each candidate beam information in the candidate beam information pool corresponding to the first set may be one of the SSB, CSI-RS, and SRS, that is, a source RS of beam information of at least one of a channel or a reference signal in the first set may be one of the SSB, CSI-RS, and SRS.

Optionally, the step 11 may include one of following actions:

action 1: determining the candidate beam information pool of the first set based on a common candidate beam information pool configured or activated by the network side device for each object of the first set;

action 2: determining the candidate beam information pool of the first set based on a candidate beam information pool configured or activated by the network side device for a first object in the first set, where other objects in the first set use the candidate beam information pool of the first object as a candidate beam information pool; where an object is at least one of a channel or a reference signal.

Optionally, in the foregoing action 1, based on the common candidate beam information pool that is configured or activated for all the objects in the first set (that is, at least one of channels or reference signals in the first set) by the network side device, the candidate beam information pool of the first set is determined, that is, the common candidate beam information pool is the candidate beam information pool of the first set.

In the foregoing action 2, based on a candidate beam information pool that is configured or activated for the first object (that is, at least one of one channel or one reference signal in the first set) in the first set by the network side device, the candidate beam information pool of the first set is determined, that is, other objects in the first set also use the candidate beam information pool of the first object. For example, when the first object is a PDCCH and other objects are PUCCHs, a TCI state pool (at least two candidate TCI states) configured for the PDCCH by the network side device is determined as a TCI state pool of the PDCCH, and then a spatial relationship pool (at least two candidate spatial relationships) of the PUCCHs is determined based on the TCI state pool of the PDCCH. For example, when the first object is a PDSCH and other objects are PUSCHs, a TCI state pool (at least two candidate TCI states) configured for the PDSCH by the network side device is determined as a TCI state pool of the PDSCH, and then a spatial relationship pool (at least two candidate spatial relationships) of the PUSCHs is determined based on the TCI state pool of the PDSCH.

Optionally, the method may further include:

determining, based on the beam information of at least one of the first channel or the first reference signal, beam information of at least one of a second channel or a second reference signal that are included in the first set.

Optionally, in a case that the beam information of at least one of the first channel or the first reference signal has been determined, the beam information of at least one of the second channel or the second reference signal that are included in the first set may be determined based on the beam information of at least one of the first channel or the first reference signal, that is, at least one of the second channel or the second reference signal uses the beam information of at least one of the first channel or the first reference signal.

For example, in a case that the first channel is a PDCCH and the second channel is a PUCCH, for the PDCCH and the PUCCH, the network side device may use a MAC CE to separately indicate beam information of the PDCCH and the PUCCH, or may determine beam information of the PUCCH based on beam information of the PDCCH indicated by using a MAC CE by the network side device, in other words, the PUCCH uses the beam information of the PDCCH. Conversely, beam information of the PDCCH may also be determined based on beam information of the PUCCH indicated by using a MAC CE by the network side device, in other words, the PDCCH uses the beam information of the PUCCH.

Optionally, the determining, based on the beam information of at least one of the first channel or the first reference signal, beam information of at least one of a second channel or a second reference signal that are included in the first set includes:

determining the beam information of at least one of the second channel or the second reference signal based on an association relationship between at least one of the first channel or the first reference signal and at least one of the second channel or the second reference signal, and based on the beam information of at least one of the first channel or the first reference signal.

Optionally, at least one of the first channel or the first reference signal has an association relationship with at least one of the second channel or the second reference signal, and the association relationship is prescribed by a protocol or configured by the network side device. In a case that the beam information of at least one of the first channel or the first reference signal has been determined, at least one of the second channel or the second reference signal may use the beam information of at least one of the first channel or the first reference signal according to the association relationship.

For example, in a case that the first channel is a PDCCH and the second channel is a PUCCH, the PDCCH (PDCCH resource) and the PUCCH (PUCCH resource/PUCCH resource group) have an associated relationship, beam information of the PUCCH may be determined based on beam information of the PDCCH indicated by using a MAC CE by the network side device, in other words, the PUCCH uses the beam information of the PDCCH.

Optionally, the determining, based on the beam information of at least one of the first channel or the first reference signal, beam information of at least one of a second channel or a second reference signal that are included in the first set may include:

determining, based on the beam information of at least one of the first channel or the first reference signal, beam information of at least one of a second channel or a second reference signal that are scheduled by at least one of the first channel or the first reference signal.

Optionally, when at least one of the first channel or the first reference signal schedules at least one of the second channel or the second reference signal, at least one of the second channel or the second reference signal may use the beam information of at least one of the first channel or the first reference signal.

For example, in a case that the first channel is a PDCCH and the second channel is a PUCCH, when the PDCCH is used to schedule the PUCCH, beam information of the PUCCH is determined based on beam information of the PDCCH, that is, the PUCCH may use the beam information of the PDCCH.

Optionally, the method may further include:

receiving second indication information for at least one of a third channel or a third reference signal that are included in the first set, where the second indication information is used to indicate one piece of candidate beam information in the candidate beam information pool; and in a case that an application time of the candidate beam information indicated by the first indication information is a latest application time, determining beam information of at least one of the first channel, the first reference signal, the third channel, or the third reference signal based on the candidate beam information indicated by the first indication information; or in a case that an application time of the candidate beam information indicated by the second indication information is a latest application time, determining beam information of at least one of the first channel, the first reference signal, the third channel, or the third reference signal based on the candidate beam information indicated by the second indication information.

Optionally, the network side device sends the second indication information to the terminal, indicating that one piece of candidate beam information in the candidate beam information pool is beam information of at least one of the third channel or the third reference signal. The candidate beam information indicated by the first indication information and the candidate beam information indicated by the second indication information may be the same candidate beam information, or may be different candidate beam information, which is not specifically limited herein.

Optionally, if candidate beam information indicated by one specific piece of indication information in the candidate beam information indicated by the first indication information and the candidate beam information indicated by the second indication information has a latest application time, the candidate beam information is used for at least one of the first channel, the first reference signal, the third channel, or the third reference signal.

For example, in a case that the first channel is a PDSCH and the third channel is a PUSCH, the network side device sends the first indication information to indicate beam information of the PDSCH, and the network side device sends the second indication information to indicate beam information of the PUSCH. If an application time of the indicated beam information of the PDSCH is a latest application time, both the PDSCH and the PUSCH use the indicated beam information of the PDSCH; and if an application time of the indicated beam information of the PUSCH is a latest application time, both the PDSCH and the PUSCH use the indicated beam information of the PUSCH.

Optionally, the method may further include any one of following actions:

action 1: updating, based on latest applicable candidate beam information indicated by indication information for any object in the first set, candidate beam information of an object included in the first set; and action 2: updating, based on latest applicable candidate beam information indicated by indication information for a preset object in the first set, candidate beam information of an object included in the first set; where an object is at least one of a channel or a reference signal.

Optionally, in the foregoing action 1, for at least one of the channel or the reference signal that are included in the first set, latest validated beam information that is of at least one of the channel or the reference signal and that is indicated by using a MAC CE or DCI is used as candidate beam information of at least one of the channel or the reference signal that are included in the first set.

In the foregoing action 2, candidate beam information indicated by indication information for at least one of a preset channel or a preset reference signal in the first set may be used as candidate beam information of at least one of the channel or the reference signal that are included in the first set. In a case that latest applicable candidate beam information indicated by the indication information for at least one of the preset channel or the preset reference signal is updated, the candidate beam information of at least one of the channel or the reference signal that are included in the first set is determined based on the applicable candidate beam information that is latest updated.

In the foregoing embodiment of the present disclosure, a TCI state pool configured for at least one of the channel or the reference signal by the network side device by using RRC or a group of TCI states activated by using a MAC CE is obtained to determine the candidate beam information pool of the first set, and then the beam information of at least one of the first channel or the first reference signal that are included in the first set is determined based on the candidate beam information pool. In addition, beam information of at least one of the channel or the reference signal can be used interchangeably. The SRS may be used as a source RS of beam information of at least one of a downlink channel or a downlink reference signal, and a CRI or an SSBRI may be used in the DCI to indicate beam information of the PUSCH. This not only reduces signaling overheads for beam indication, but also improves flexibility of beam indication.

Figure 2:
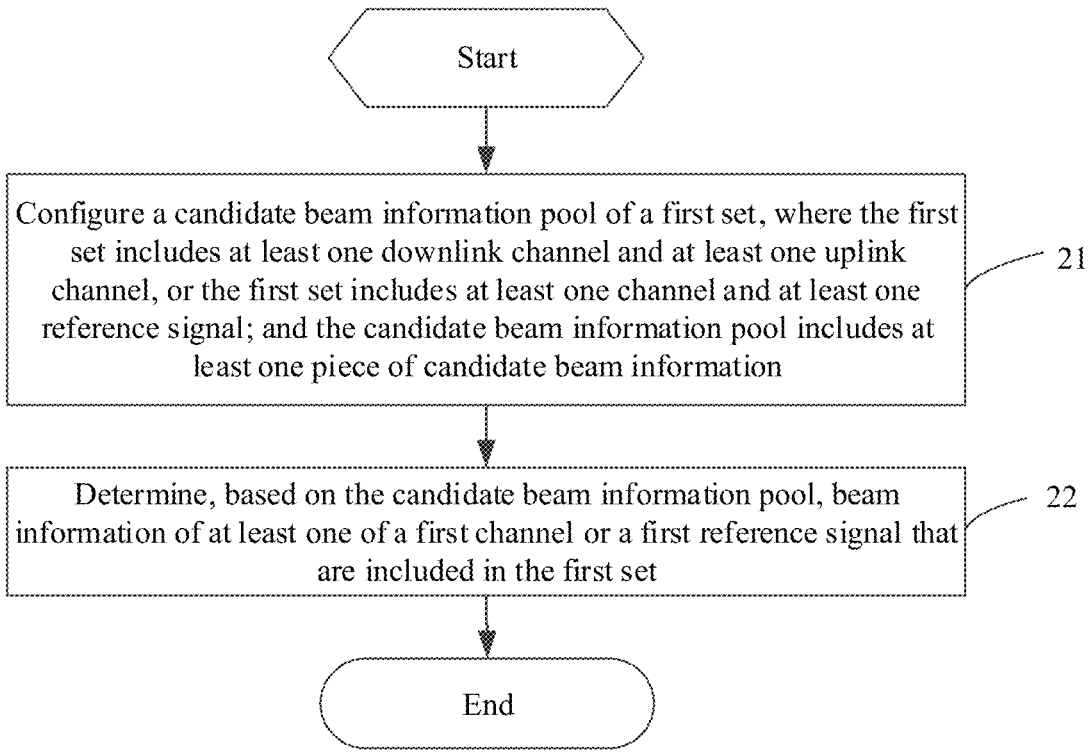
FIG. 2 is a second schematic flowchart of a beam information determining method according to an embodiment of the present disclosure.

As shown in FIG. 2, an embodiment of the present disclosure further provides a beam information determining method, applied to a network side device and including the following steps.

Step 21: Configure a candidate beam information pool of a first set, where the first set includes at least one downlink channel and at least one uplink channel, or the first set includes at least one channel and at least one reference signal; and the candidate beam information pool includes at least one piece of candidate beam information.

Optionally, the first set herein may be an explicit set, or may point to only at least one downlink channel and at least one uplink channel, or may point to only at least one channel and at least one reference signal, or may be directly replaced with at least one downlink channel and at least one uplink channel, or may be directly replaced with at least one channel and at least one reference signal. The first set may also be referred to as a target object.

For example, the first set may include a PDCCH and a PUCCH, or may include a PDSCH and a PUCCH, or may include a PUSCH and an SRS, or may include a PDSCH and an SRS, or may include a PDSCH and a PUSCH, or may include a PDCCH, a PDSCH, and a PUCCH; or the like, which is not specifically limited herein.

Optionally, the network side device may configure the candidate beam information pool (for example, a group of candidate TCI states) of the first set by using RRC signaling, or activate a group of common TCI states by using a MAC CE.

For example, the network side device configures a candidate beam information pool for the PDCCH by using RRC signaling, and the network side device uses the candidate beam information pool as the candidate beam information pool of the first set. For another example, the network side device configures a candidate beam information pool for the PDSCH by using RRC signaling, and the network side device uses the candidate beam information pool as the candidate beam information pool of the first set. For still another example, the network side device configures a candidate beam information pool for the PUCCH by using RRC signaling, and the network side device uses the candidate beam information pool as the candidate beam information pool of the first set. For still another example, the network side device configures a candidate beam information pool for the PDSCH by using RRC signaling, and then activates a group of candidate beam information in the candidate beam information pool by using a MAC CE, and the network side device determines the activated group of candidate beam information to be the candidate beam information pool of the first set.

Step 22: Determine, based on the candidate beam information pool, beam information of at least one of a first channel or a first reference signal that are included in the first set.

Optionally, the beam information of at least one of the first channel or the first reference signal in the first set is determined based on the configured candidate beam information pool of the first set.

In the foregoing embodiment of the present disclosure, the candidate beam information pool of the first set is configured, and the beam information of at least one of the first channel or the first reference signal that are included in the first set is determined based on the candidate beam information pool, where the first set includes at least one downlink channel and at least one uplink channel, or the first set includes at least one channel and at least one reference signal; and the candidate beam information pool includes at least one piece of candidate beam information. This can reduce signaling overheads for beam indication.

Optionally, in a case that the candidate beam information pool includes one piece of candidate beam information, the step 22 may include:

determining, based on the one piece of candidate beam information included in the candidate beam information pool, the beam information of at least one of the first channel or the first reference signal that are included in the first set.

Optionally, when there is only one piece of candidate beam information in the candidate beam information pool configured by the network side device, the candidate beam information may be determined as the configured beam information of at least one of the first channel or the first reference signal.

Optionally, in a case that the candidate beam information pool includes at least two pieces of candidate beam information, the step 22 may include:

sending first indication information for at least one of the first channel or the first reference signal that are included in the first set, where the first indication information is used to indicate one piece of candidate beam information in the candidate beam information pool; and determining the beam information of at least one of the first channel or the first reference signal based on the first indication information.

Optionally, if the candidate beam information pool configured by the network side device includes two or more pieces of candidate beam information, the network side device sends the first indication information to the terminal, indicating that one of the two or more pieces of candidate beam information is the beam information of at least one of the first channel or the first reference signal. The network side device determines the beam information of at least one of the first channel or the first reference signal based on the first indication information.

Optionally, in a case that the first reference signal is an SRS, the sending first indication information for the first reference signal may include:

sending first downlink control information DCI, where the first DCI carries the first indication information.

Optionally, the network side device sends the first DCI carrying the first indication information, that is, the network side device uses the DCI to indicate beam information of the SRS.

Optionally, the first DCI includes an SRS request field, and the SRS request field carries the first indication information.

For example, in a case that the candidate beam information pool is a group of TCI states (at least two TCI states) configured by the network side device by using RRC or activated for the PDSCH by using a MAC CE, an SRS request field (request field) in an existing signaling is extended, and one TCI state is selected from the candidate beam information pool to determine the beam information of the SRS, that is, the beam information of the SRS is one TCI state in the group of configured or activated TCI states.

Optionally, in a case that the first channel is a PUSCH, the sending first indication information for the first channel may include:

sending second DCI, where the second DCI includes a CRI field or an SSBRI field, and the CRI field or the SSBRI field carries the first indication information; where the CRI field or the SSBRI field is associated with a target SRS resource.

Optionally, the network side device sends the second DCI, that is, using the DCI to indicate the beam information. For example, in a case that the first channel is a PUSCH, a CRI or an SSBRI in the second DCI format 0_1 is used to indicate beam information of the PUSCH, and the indicated CRI/SSBRI is associated with the target SRS resource (for example, a CRI or an SSBRI associated with an SRS resource is used as a source RS in spatial relation information of the target SRS resource).

Optionally, in a case that the PUSCH is a codebook-based PUSCH, the second DCI does not include an SRI field, or a length of the SRI field is zero bits; or in a case that the PUSCH is a non-codebook-based PUSCH, the second DCI includes an SRI field or a length of the SRI field is greater than zero bits; and the SRI field is used for CSI measurement.

Optionally, a source reference signal of each piece of candidate beam information included in the candidate beam information pool is any one of an SSB, a CSI-RS, and an SRS.

Optionally, a source RS of each candidate beam information in the candidate beam information pool corresponding to the first set may be one of the SSB, CSI-RS, and SRS, that is, a source RS of beam information of at least one of a channel or a reference signal in the first set may be one of the SSB, CSI-RS, and SRS.

Optionally, the step 21 may include one of following actions:

action 1: configuring or activating a common candidate beam information pool for each object in the first set; and action 2: configuring or activating a candidate beam information pool of a first object in the first set, where other objects in the first set use the candidate beam information pool of the first object as a candidate beam information pool; where an object is at least one of a channel or a reference signal.

Optionally, in the foregoing action 1, the network side device configures or activates the common candidate beam information pool for all the objects in the first set (that is, at least one of channels or reference signals in the first set), that is, the common candidate beam information pool is the candidate beam information pool of the first set.

In the foregoing action 2, the network side device configures or activates the candidate beam information pool for the first object (that is, at least one of one channel or one reference signal in the first set) in the first set, that is, other objects in the first set also use the candidate beam information pool of the first object. For example, when the first object is a PDCCH and other objects are PUCCHs, a TCI state pool (at least two candidate TCI states) is configured for the PDCCH by the network side device, and then the PUCCHs use the TCI state pool as a spatial relationship pool (at least two candidate spatial relationships) of the PUCCHs. For example, when the first object is a PDSCH and other objects are PUSCHs, the network side device configures a TCI state pool (at least two candidate TCI states) for the PDSCH by the network side device and determines the TCI state pool as a TCI state pool of the PDSCH, and then the PUCCHs use the TCI state pool as a spatial relationship pool (at least two candidate spatial relationships) of the PUCCHs.

Optionally, the method may further include:

determining, based on the beam information of at least one of the first channel or the first reference signal, beam information of at least one of a second channel or a second reference signal that are included in the first set.

Optionally, in a case that the beam information of at least one of the first channel or the first reference signal has been determined, the beam information of at least one of the second channel or the second reference signal that are included in the first set may be determined based on the beam information of at least one of the first channel or the first reference signal, that is, at least one of the second channel or the second reference signal uses the beam information of at least one of the first channel or the first reference signal.

For example, in a case that the first channel is a PDCCH and the second channel is a PUCCH, for the PDCCH and the PUCCH, the network side device may use a MAC CE to separately indicate beam information of the PDCCH and the PUCCH, or may determine beam information of the PUCCH based on beam information of the PDCCH indicated by using a MAC CE by the network side device, in other words, the PUCCH uses the beam information of the PDCCH. Conversely, beam information of the PDCCH may also be determined based on beam information of the PUCCH indicated by using a MAC CE by the network side device, in other words, the PDCCH uses the beam information of the PUCCH.

Optionally, the determining, based on the beam information of at least one of the first channel or the first reference signal, beam information of at least one of a second channel or a second reference signal that are included in the first set may include:

determining the beam information of at least one of the second channel or the second reference signal based on an association relationship between at least one of the first channel or the first reference signal and at least one of the second channel or the second reference signal, and based on the beam information of at least one of the first channel or the first reference signal.

Optionally, at least one of the first channel or the first reference signal has an association relationship with at least one of the second channel or the second reference signal, and the association relationship is prescribed by a protocol or configured by the network side device. In a case that the beam information of at least one of the first channel or the first reference signal has been determined, at least one of the second channel or the second reference signal may use the beam information of at least one of the first channel or the first reference signal according to the association relationship.

For example, in a case that the first channel is a PDCCH and the second channel is a PUCCH, the PDCCH (PDCCH resource) and the PUCCH (PUCCH resource/PUCCH resource group) have an associated relationship, beam information of the PUCCH may be determined based on beam information of the PDCCH indicated by using a MAC CE by the network side device, in other words, the PUCCH uses the beam information of the PDCCH.

Optionally, the determining, based on the beam information of at least one of the first channel or the first reference signal, beam information of at least one of a second channel or a second reference signal that are included in the first set may include:

determining, based on the beam information of at least one of the first channel or the first reference signal, beam information of at least one of a second channel or a second reference signal that are scheduled by at least one of the first channel or the first reference signal.

Optionally, when at least one of the first channel or the first reference signal schedules at least one of the second channel or the second reference signal, at least one of the second channel or the second reference signal may use the beam information of at least one of the first channel or the first reference signal.

For example, in a case that the first channel is a PDCCH and the second channel is a PUCCH, when the PDCCH is used to schedule the PUCCH, beam information of the PUCCH is determined based on beam information of the PDCCH, that is, the PUCCH may use the beam information of the PDCCH.

Optionally, the method may further include:

sending second indication information for at least one of a third channel or a third reference signal that are included in the first set, where the second indication information is used to indicate one piece of candidate beam information in the candidate beam information pool; and in a case that an application time of the candidate beam information indicated by the first indication information is a latest application time, determining beam information of at least one of the first channel, the first reference signal, the third channel, or the third reference signal based on the candidate beam information indicated by the first indication information; or in a case that an application time of the candidate beam information indicated by the second indication information is a latest application time, determining beam information of at least one of the first channel, the first reference signal, the third channel, or the third reference signal based on the candidate beam information indicated by the second indication information.

Optionally, the network side device sends the second indication information, indicating that one piece of candidate beam information in the candidate beam information pool is beam information of at least one of the third channel or the third reference signal. The candidate beam information indicated by the first indication information and the candidate beam information indicated by the second indication information may be the same candidate beam information, or may be different candidate beam information, which is not specifically limited herein.

Optionally, if candidate beam information indicated by one specific piece of indication information in the candidate beam information indicated by the first indication information and the candidate beam information indicated by the second indication information has a latest application time, the candidate beam information is used for at least one of the first channel, the first reference signal, the third channel, or the third reference signal.

For example, in a case that the first channel is a PDSCH and the third channel is a PUSCH, the network side device sends the first indication information to indicate beam information of the PDSCH, and the network side device sends the second indication information to indicate beam information of the PUSCH. If an application time of the indicated beam information of the PDSCH is a latest application time, both the PDSCH and the PUSCH use the indicated beam information of the PDSCH; and if an application time of the indicated beam information of the PUSCH is a latest application time, both the PDSCH and the PUSCH use the indicated beam information of the PUSCH.

Optionally, the method may further include any one of following actions:

action 1: updating, based on latest applicable candidate beam information indicated by indication information for any object in the first set, candidate beam information of an object included in the first set; and action 2: updating, based on latest applicable candidate beam information indicated by indication information for a preset object in the first set, candidate beam information of an object included in the first set; where an object is at least one of a channel or a reference signal.

Optionally in the foregoing action 1, for at least one of the channel or the reference signal that are included in the first set, latest validated beam information that is of at least one of one channel or one reference signal and that is indicated by using a MAC CE or DCI is used as candidate beam information of at least one of the channel or the reference signal that are included in the first set.

In the foregoing action 2, candidate beam information indicated by indication information for at least one of a preset channel or a preset reference signal in the first set may be used as candidate beam information of at least one of the channel or the reference signal that are included in the first set. In a case that latest applicable candidate beam information indicated by the indication information for at least one of the preset channel or the preset reference signal is updated, the candidate beam information of at least one of the channel or the reference signal that are included in the first set is determined based on the applicable candidate beam information that is latest updated.

It should be noted that all the descriptions of the embodiments of the beam information determining method applied to the terminal in the foregoing embodiments are applicable to the embodiments of the beam information determining method applied to the network side device, with the same technical effects achieved, and details are not described herein again.

In the foregoing embodiment of the present disclosure, a TCI state pool is configured by using RRC or a group of TCI states is activated by using a MAC CE for at least one of the channel or the reference signal, and then the beam information of at least one of the first channel or the first reference signal that are included in the first set is determined based on the candidate beam information pool. In addition, beam information of at least one of the channel or the reference signal can be used interchangeably. The SRS may be used as a source RS of beam information of at least one of a downlink channel or a downlink reference signal, and a CRI or an SSBRI may be used in the DCI to indicate beam information of the PUSCH. This not only reduces signaling overheads for beam indication, but also improves flexibility of beam indication.

Figure 3:
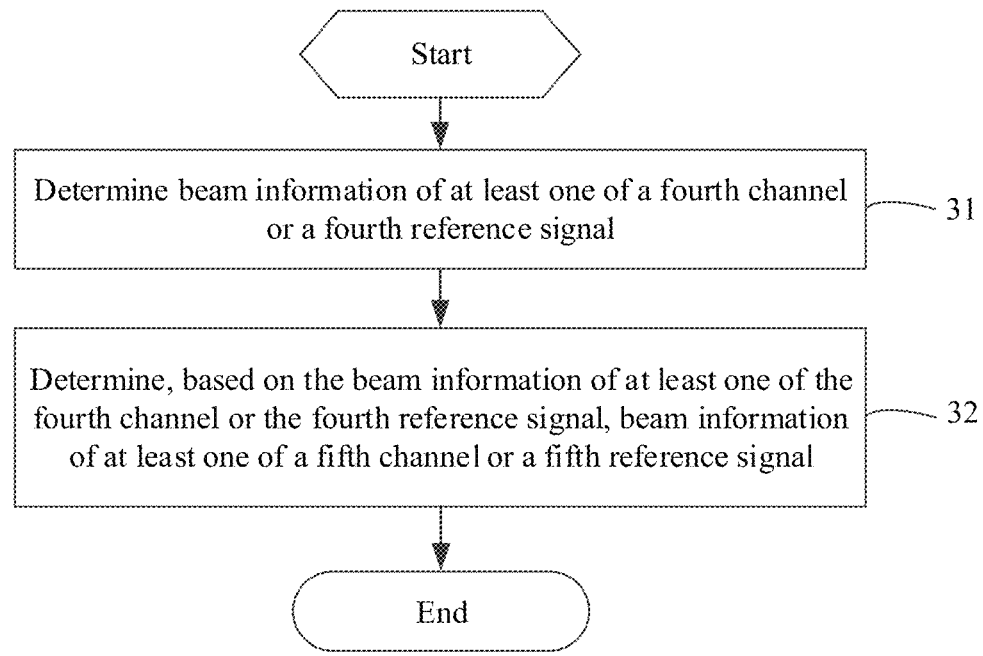
FIG. 3 is a third schematic flowchart of a beam information determining method according to an embodiment of the present disclosure.

As shown in FIG. 3, an embodiment of the present disclosure further provides a beam information determining method, applied to a communications device and including the following steps.

Step 31: determine beam information of at least one of a fourth channel or a fourth reference signal.

Optionally, the communications device may be a terminal or a network side device. In a case that the communications device is a terminal, beam information configured, activated, or indicated by the network side device for at least one of the fourth channel or the fourth reference signal is obtained. In a case that the communications device is a network side device, configured, activated, or indicated beam information of at least one of the fourth channel or the fourth reference signal is sent.

Step 32: determine, based on the beam information of at least one of the fourth channel or the fourth reference signal, beam information of at least one of a fifth channel or a fifth reference signal.

Optionally, in a case that the beam information of at least one of the fourth channel or the fourth reference signal has been determined, at least one of the fifth channel or the fifth reference signal uses the beam information of at least one of the fourth channel or the fourth reference signal.

In the foregoing embodiment of the present disclosure, the beam information of at least one of the fourth channel or the fourth reference signal has been determined, and then the beam information of at least one of the fifth channel or the fifth reference signal is determined based on the beam information of at least one of the fourth channel or the fourth reference signal. This can not only reduce signaling overheads for beam indication, but also improve flexibility of beam indication.

Optionally, in a case that the fifth channel is a physical uplink control channel PUCCH, and the fourth channel is a physical downlink shared channel PDSCH, the step 32 may include:

determining beam information of the PUCCH based on TCI state information corresponding to a preset code point in a TCI field included in third DCI, where the TCI field is used to indicate beam information of the PDSCH.

Optionally, in a case that the communications device is a terminal, the terminal receives the third DCI, and the third DCI includes a TCI field. In a case that the communications device is a network side device, the network side device sends the third DCI, that is, indicating the beam information by using the DCI.

Optionally, when the preset code point corresponds to one piece of TCI state information, the beam information of the PUCCH is determined based on the TCI state information.

Optionally, in a case that the TCI field corresponds to two or more pieces of TCI state information, the determining beam information of the PUCCH based on TCI state information corresponding to a preset code point in a TCI field included in third DCI includes:

determining, based on the two or more pieces of TCI state information, beam information of PUCCHs pointing to two or more transmission and reception points TRPs, respectively; or determining, based on the two or more pieces of TCI state information, beam information of PUCCHs corresponding to two or more TRP identifiers, respectively.

Optionally, when the preset code point corresponds to two or more pieces of TCI state information, the beam information of the PUCCH pointing to the two or more TRPs is determined based on the two or more pieces of TCI state information, respectively. In other words, beam information of the PUCCH corresponding to two or more TRP identifiers (for example, a control resource set pool index CORESET-PoolIndex) is determined based on the two or more pieces of TCI state information, respectively.

Optionally, in a case that the fifth channel is a PUCCH and the fourth channel is a PDCCH, the step 32 may include:

determining beam information of the PUCCH based on beam information of the PDCCH.

Optionally, in a case that the beam information of the PDCCH has been determined, the PUCCH uses the beam information of the PDCCH.

Optionally, in a case that the fifth channel is a PUCCH, if the PDCCH and the PDSCH correspond to different TRPs or TRP identifiers:

step 32 may include:

determining the beam information of the PUCCH based on beam information of a higher-priority channel in the PDCCH and the PDSCH.

Optionally, if the PDCCH and the PDSCH correspond to different TRPs or TRP identifiers, the PUCCH uses the beam information of the higher-priority channel in the PDCCH and the PDSCH.

Optionally, in a case that the fifth reference signal is an SRS, the fourth channel is a PDSCH or a PUSCH.

Optionally, in a case that the beam information of the PDSCH has been determined, the SRS uses the beam information of the PDSCH; and in a case that the beam information of the PUSCH has been determined, the SRS uses the beam information of the PUSCH.

In the foregoing embodiment of the present disclosure, the beam information of at least one of the fourth channel or the fourth reference signal has been determined, and then the beam information of at least one of the fifth channel or the fifth reference signal is determined based on the beam information of at least one of the fourth channel or the fourth reference signal. This can not only reduce signaling overheads for beam indication, but also improve flexibility of beam indication.

Figure 4:
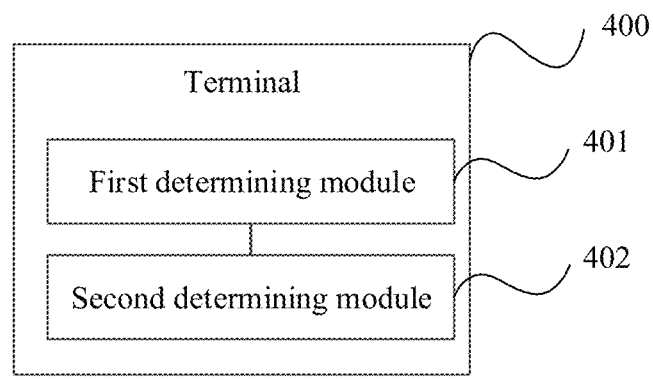
FIG. 4 is a schematic modular diagram of a terminal according to an embodiment of the present disclosure.

As shown in FIG. 4, an embodiment of the present disclosure further provides a terminal 400, including:
a first determining module 401, configured to determine a candidate beam information pool of a first set, where the first set includes at least one downlink channel and at least one uplink channel, or the first set includes at least one channel and at least one reference signal; and the candidate beam information pool includes at least one piece of candidate beam information; and
a second determining module 402, configured to determine, based on the candidate beam information pool, beam information of at least one of a first channel or a first reference signal that are included in the first set.

Optionally, in a case that the candidate beam information pool includes one piece of candidate beam information, the second determining module 402 includes:
a first determining unit, configured to determine, based on the one piece of candidate beam information included in the candidate beam information pool, the beam information of at least one of the first channel or the first reference signal that are included in the first set.

Optionally, in a case that the candidate beam information pool includes at least two pieces of candidate beam information, the second determining module 402 includes:
a first receiving unit, configured to receive first indication information for at least one of the first channel or the first reference signal that are included in the first set, where the first indication information is used to indicate one piece of candidate beam information in the candidate beam information pool; and
a second determining unit, configured to determine the beam information of at least one of the first channel or the first reference signal based on the first indication information.

Optionally, a source reference signal of each piece of candidate beam information included in the candidate beam information pool is any one of a synchronization signal block SSB, a channel state information reference signal CSI-RS, and a channel sounding reference signal SRS.

Optionally, the first determining module 401 includes:
a third determining unit, configured to determine the candidate beam information pool of the first set based on a common candidate beam information pool configured or activated by the network side device for each object of the first set; or
determine the candidate beam information pool of the first set based on a candidate beam information pool configured or activated by the network side device for a first object in the first set, where other objects in the first set use the candidate beam information pool of the first object as a candidate beam information pool; where
an object is at least one of a channel or a reference signal.

Optionally, the terminal further includes:
a first processing module, configured to determine, based on the beam information of at least one of the first channel or the first reference signal, beam information of at least one of a second channel or a second reference signal that are included in the first set.

Optionally, the first processing module includes:
a first processing unit, configured to determine the beam information of at least one of the second channel or the second reference signal based on an association relationship between at least one of the first channel or the first reference signal and at least one of the second channel or the second reference signal, and based on the beam information of at least one of the first channel or the first reference signal.

Optionally, the first processing module includes:
a second processing unit, configured to determine, based on the beam information of at least one of the first channel or the first reference signal, beam information of at least one of a second channel or a second reference signal that are scheduled by at least one of the first channel or the first reference signal.

Optionally, the terminal further includes:
a first receiving module, configured to receive second indication information for at least one of the third channel or the third reference signal that are included in the first set, where the second indication information is used to indicate one piece of candidate beam information in the candidate beam information pool; and
a second processing module, configured to: in a case that an application time of the candidate beam information indicated by the first indication information is a latest application time, determine beam information of at least one of the first channel, the first reference signal, the third channel, or the third reference signal based on the candidate beam information indicated by the first indication information; or
a third processing module, configured to: in a case that an application time of the candidate beam information indicated by the second indication information is a latest application time, determine beam information of at least one of the first channel, the first reference signal, the third channel, or the third reference signal based on the candidate beam information indicated by the second indication information.

Optionally, in a case that the first reference signal is a channel sounding reference signal SRS, the first receiving unit is configured to:
receive first downlink control information DCI, where the first DCI carries the first indication information.

Optionally, the first DCI includes an SRS request field, and the SRS request field carries the first indication information.

Optionally, in a case that the first channel is a physical uplink shared channel PUSCH, the first receiving unit includes:
receiving second DCI, where the second DCI includes a channel state information reference signal resource indicator CRI field or a synchronization signal block resource indicator SSBRI field, and the CRI field or the SSBRI field carries the first indication information; where
the CRI field or the SSBRI field is associated with a target SRS resource.

Optionally, in a case that the PUSCH is a codebook-based PUSCH, the second DCI does not include an SRI field, or a length of the SRI field is zero bits; or
in a case that the PUSCH is a non-codebook-based PUSCH, the second DCI includes an SRI field or a length of the SRI field is greater than zero bits; and the SRI field is used for CSI measurement.

Optionally, the terminal further includes:
a first updating module, configured to update, based on latest applicable candidate beam information indicated by indication information for any object in the first set, candidate beam information of an object included in the first set; or update, based on latest applicable candidate beam information indicated by indication information for a preset object in the first set, candidate beam information of an object included in the first set; where an object is at least one of a channel or a reference signal.

It should be noted that the embodiment of the terminal is a terminal corresponding to the foregoing beam information determining method applied to the terminal. All the implementations of the foregoing embodiment are applicable to the embodiment of the terminal, with the same technical effects achieved.

Figure 5:
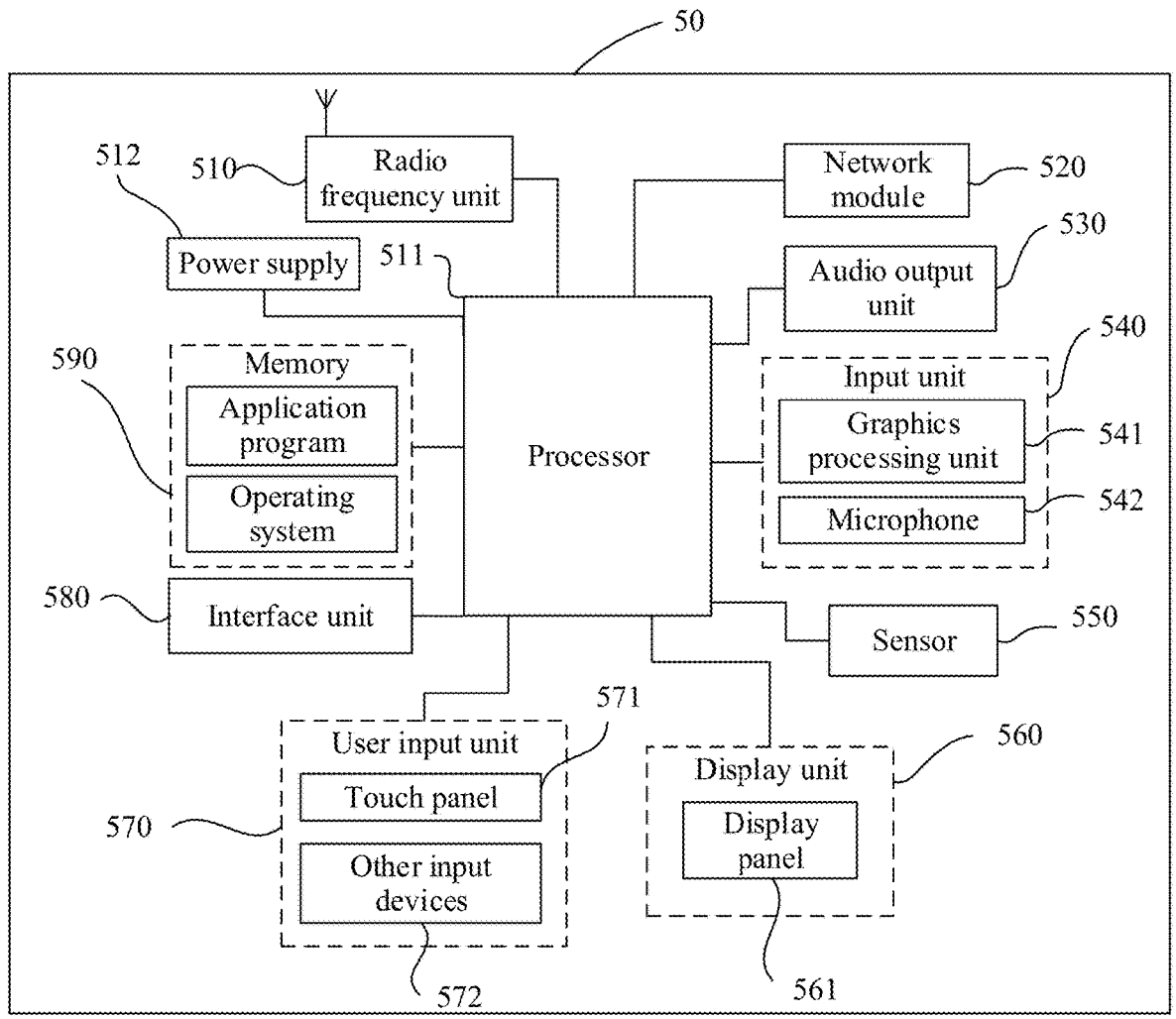
FIG. 5 is a structural block diagram of a terminal according to an embodiment of the present disclosure.

FIG. 5 is a schematic diagram of a hardware structure of a terminal for implementing the embodiments of the present disclosure.

The terminal 50 includes but is not limited to components such as a radio frequency unit 510, a network module 520, an audio output unit 530, an input unit 540, a sensor 550, a display unit 560, a user input unit 570, an interface unit 580, a memory 590, a processor 511, and a power supply 512. A person skilled in the art may understand that the structure of the terminal shown in FIG. 5 does not constitute any limitation on the terminal device. The terminal may include more or fewer components than those shown in the figure, or a combination of some components, or the components disposed differently. In this embodiment of the present disclosure, the terminal includes, but is not limited to, a mobile phone, a tablet computer, a laptop computer, a personal digital assistant, an in-vehicle terminal, a wearable device, a pedometer, and the like.

The processor 510 determines a candidate beam information pool of a first set, where the first set includes at least one downlink channel and at least one uplink channel, or the first set includes at least one channel and at least one reference signal; and the candidate beam information pool includes at least one piece of candidate beam information; and determines, based on the candidate beam information pool, beam information of at least one of a first channel or a first reference signal that are included in the first set.

It should be understood that in this embodiment of the present disclosure, the radio frequency unit 510 may be configured to receive and send information, or to receive and send a signal in a call process, and Optionally, after receiving downlink data from a network side device, send the downlink data to the processor 511 for processing; and also send uplink data to the network side device. Generally, the radio frequency unit 510 includes but is not limited to an antenna, at least one amplifier, a transceiver, a coupler, a low noise amplifier, a duplexer, and the like. In addition, the radio frequency unit 510 may also communicate with a network and other devices via a wireless communications system.

The terminal provides a user with wireless broadband internet access through the network module 520, for example, helping the user to send and receive e-mails, browse web pages, and access streaming media.

The audio output unit 530 may convert audio data received by the radio frequency unit 510 or the network module 520 or stored in the memory 590 into an audio signal and output the audio signal as a sound. Furthermore, the audio output unit 530 may also provide audio output (for example, a call signal received sound or a message received sound) related to a specific function performed by the terminal 50. The audio output unit 530 includes a speaker, a buzzer, a receiver, and the like.

The input unit 540 is configured to receive an audio or video signal. The input unit 540 may include a graphics processing unit (GPU) 541 and a microphone 542. The graphics processing unit 541 processes image data of a still picture or video obtained by an image capture apparatus (such as a camera) in a video capture mode or an image capture mode. A processed image frame may be displayed on the display unit 560. The image frame processed by the graphics processing unit 541 may be stored in the memory 590 (or another storage medium) or be sent by the radio frequency unit 510 or the network module 520. The microphone 542 is capable of receiving sounds and processing such sounds into audio data. The processed audio data can be converted into a format output that can be sent to a mobile communication network device through the radio frequency unit 510 in a telephone call mode.

The mobile terminal 50 may further include at least one sensor 550, for example, an optical sensor, a motion sensor, and another sensor. Optionally, the optical sensor includes an ambient light sensor and a proximity sensor. The ambient light sensor may adjust luminance of the display panel 561 based on brightness of ambient light, and the proximity sensor may turn off the display panel 561 and/or backlight when the terminal 50 moves close to an ear. As a motion sensor, an accelerometer sensor may detect the magnitude of acceleration in each direction (generally three axes), and in a stationary state, may detect the magnitude and direction of gravity, and may be used to recognize terminal postures (for example, shift between a landscape orientation and a portrait orientation, related games, and magnetometer posture calibration), vibration recognition-related functions (such as a pedometer and knocking), and the like. The sensor 550 may further include a fingerprint sensor, a pressure sensor, an iris sensor, a molecular sensor, a gyroscope, a barometer, a hygrometer, a thermometer, an infrared sensor, and the like. Details are not described herein again.

The display unit 560 is configured to display information input by the user or information provided to the user. The display unit 560 may include a display panel 561, and the display panel 561 may be configured in a form of a liquid crystal display (LCD), an organic light-emitting diode (OLED), or the like.

The user input unit 570 may be configured to: receive digit or character information that is input, and generate signal input related to user settings and function control of the terminal. Optionally, the user input unit 570 may include a touch panel 571 and other input devices 572. The touch panel 571 is also referred to as a touchscreen and can collect a touch operation (such as an operation performed by the user on the touch panel 571 or near the touch panel 571 with a finger or by using any proper object or accessory such as a stylus) of the user on or near the touch panel 571. The touch panel 571 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 511; and can receive a command sent by the processor 511 and execute the command. In addition, the touch panel 571 may be implemented in a plurality of forms, for example, as a resistive, capacitive, infrared, or surface acoustic wave touch panel. The user input unit 570 may further include other input devices 572 in addition to the touch panel 571. Optionally, the other input devices 572 may include but are not limited to a physical keyboard, a function key (such as a volume control key or a switch key), a trackball, a mouse, and a joystick. Details are not described herein.

Optionally, the touch panel 571 may cover the display panel 561. When detecting a touch operation on or near the touch panel 571, the touch panel 571 transmits the touch operation to the processor 511 to determine a type of a touch event. Then, the processor 511 provides a corresponding visual output on the display panel 561 based on the type of the touch event. In FIG. 5, the touch panel 571 and the display panel 561 serve as two independent components to implement input and output functions of the terminal. In some embodiments, however, the touch panel 571 may be integrated with the display panel 561 to implement the input and output functions of the terminal. Details are not limited herein.

The interface unit 580 is an interface between an external apparatus and the terminal 50. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 580 may be configured to receive an input (for example, data information or power) from an external apparatus and transmit the received input to one or more elements within the terminal 50, or may be configured to transmit data between the terminal 50 and the external apparatus.

The memory 590 may be configured to store software programs and various data. The memory 590 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 540 may include a high-speed random access memory, and may further include a non-volatile memory such as at least one disk storage device, a flash memory device, or another volatile solid-state storage device.

The processor 511 is a control center of the terminal, uses various interfaces and lines to connect parts of the entire terminal, and executes various functions and processes data of the terminal by running or executing software programs and/or modules stored in the memory 590 and invoking data stored in the memory 590, so as to perform overall monitoring on the terminal. The processor 511 may include one or more processing units. Optionally, an application processor and a modem processor may be integrated in the processor 511. The application processor primarily processes an operating system, user interfaces, application programs, and the like. The modem processor primarily processes radio communication. It can be understood that the modem processor may alternatively be not integrated in the processor 511.

The terminal 50 may further include the power supply 512 (such as a battery) supplying power to each component. Optionally, the power supply 512 may be logically connected to the processor 511 by using a power management system, so that functions such as charge and discharge management and power consumption management are implemented by using the power management system.

In addition, the terminal 50 includes some functional modules that are not illustrated. Details are not described herein.

Optionally, an embodiment of the present disclosure further provides a terminal, including a processor 511, a memory 590, and a computer program stored in the memory 590 and executable on the processor 511. When the computer program is executed by the processor 511, the processes of the foregoing embodiment of the beam information determining method applied to the terminal can be implemented, with same technical effects achieved. To avoid repetition, details are not described herein again.

An embodiment of the present disclosure further provides a non-transitory computer-readable storage medium, where a computer program is stored in the non-transitory computer-readable storage medium. When the computer program is executed by a processor, the processes of the foregoing embodiment of the beam information determining method applied to the terminal can be implemented, with same technical effects achieved. To avoid repetition, details are not described herein again. The non-transitory computer-readable storage medium is, for example, a read-only memory (ROM), a random access memory (RAM), a magnetic disk, or an optical disc.

Figure 6:
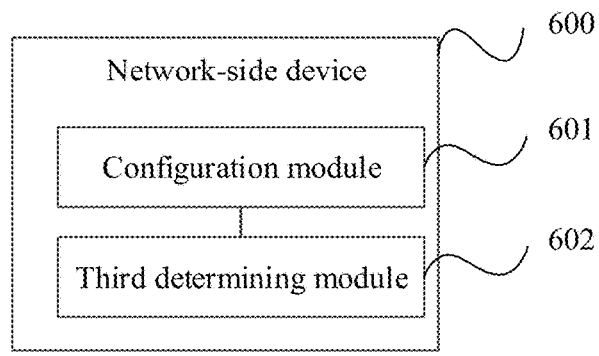
FIG. 6 is a schematic modular diagram of a network side device according to an embodiment of the present disclosure.

As shown in FIG. 6, an embodiment of the present disclosure further provides a network side device 600, including:
- a configuration module 601, configured to configure a candidate beam information pool of a first set, where the first set includes at least one downlink channel and at least one uplink channel, or the first set includes at least one channel and at least one reference signal; and the candidate beam information pool includes at least one piece of candidate beam information; and
- a third determining module 602, configured to determine, based on the candidate beam information pool, beam information of at least one of a first channel or a first reference signal that are included in the first set.

Optionally, in a case that the candidate beam information pool includes one piece of candidate beam information, the third determining module 602 includes:
- a fourth determining unit, configured to determine, based on the one piece of candidate beam information included in the candidate beam information pool, the beam information of at least one of the first channel or the first reference signal that are included in the first set.

Optionally, in a case that the candidate beam information pool includes at least two pieces of candidate beam information, the third determining module 602 includes:
- a first sending unit, configured to send first indication information for at least one of the first channel or the first reference signal that are included in the first set, where the first indication information is used to indicate one piece of candidate beam information in the candidate beam information pool; and
- a fifth determining unit, configured to determine the beam information of at least one of the first channel or the first reference signal based on the first indication information.

Optionally, a source reference signal of each piece of candidate beam information included in the candidate beam information pool is any one of an SSB, a CSI-RS, and an SRS.

Optionally, the configuration module 601 includes:
- a first configuration unit, configured to configure or activate a common candidate beam information pool for each object in the first set; or configure or activate a candidate beam information pool of a first object in the first set; where other objects in the first set use the candidate beam information pool of the first object as a candidate beam information pool; where an object is at least one of a channel or a reference signal.

Optionally, the network side device further includes:

a fourth processing module, configured to determine, based on the beam information of at least one of the first channel or the first reference signal, beam information of at least one of a second channel or a second reference signal that are included in the first set.

Optionally, the fourth processing module includes:

a first processing unit, configured to determine the beam information of at least one of the second channel or the second reference signal based on an association relationship between at least one of the first channel or the first reference signal and at least one of the second channel or the second reference signal, and based on the beam information of at least one of the first channel or the first reference signal.

Optionally, the fourth processing module includes:

a second processing unit, configured to determine, based on the beam information of at least one of the first channel or the first reference signal, beam information of at least one of a second channel or a second reference signal that are scheduled by at least one of the first channel or the first reference signal.

Optionally, the network side device further includes:

a sending module, configured to send second indication information for at least one of a third channel or a third reference signal that are included in the first set, where the second indication information is used to indicate one piece of candidate beam information in the candidate beam information pool; and a fifth processing module, configured to: in a case that an application time of the candidate beam information indicated by the first indication information is a latest application time, determine beam information of at least one of the first channel, the first reference signal, the third channel, or the third reference signal based on the candidate beam information indicated by the first indication information; or a sixth processing module, configured to: in a case that an application time of the candidate beam information indicated by the second indication information is a latest application time, determine beam information of at least one of the first channel, the first reference signal, the third channel, or the third reference signal based on the candidate beam information indicated by the second indication information.

Optionally, in a case that the first reference signal is an SRS, the first sending unit is configured to:

send first downlink control information DCI, where the first DCI carries the first indication information.

Optionally, the first DCI includes an SRS request field, and the SRS request field carries the first indication information.

Optionally, in a case that the first channel is a PUSCH, the first sending unit includes:

sending second DCI, where the second DCI includes a CRI field or an SSBRI field, and the CRI field or the SSBRI field carries the first indication information; where the CRI field or the SSBRI field is associated with a target SRS resource.

Optionally, in a case that the PUSCH is a codebook-based PUSCH, the second DCI does not include an SRI field, or a length of the SRI field is zero bits; or in a case that the PUSCH is a non-codebook-based PUSCH, the second DCI includes an SRI field or a length of the SRI field is greater than zero bits; and the SRI field is used for CSI measurement.

Optionally, the network side device further includes:

a second updating module, configured to update, based on latest applicable candidate beam information indicated by indication information for any object in the first set, candidate beam information of an object included in the first set; or update, based on latest applicable candidate beam information indicated by indication information for a preset object in the first set, candidate beam information of an object included in the first set; where an object is at least one of a channel or a reference signal.

It should be noted that the embodiment of the network side device is a network side device corresponding to the foregoing beam information determining method applied to the network side device. All the implementations of the foregoing embodiment are applicable to the embodiment of the network side device, with the same technical effects achieved.

An embodiment of the present disclosure further provides a network side device, including a processor, a memory, and a computer program stored in the memory and executable on the processor. When the computer program is executed by the processor, the processes of the foregoing beam information determining method embodiment applied to the network side device can be implemented, with the same technical effects achieved. To avoid repetition, details are not described herein again.

An embodiment of the present disclosure further provides a non-transitory computer-readable storage medium, where a computer program is stored in the non-transitory computer-readable storage medium. When the computer program is executed by a processor, the processes of the foregoing beam information determining method embodiment applied to the network side device can be implemented, with the same technical effects achieved. To avoid repetition, details are not described herein again. The non-transitory computer-readable storage medium is, for example, a read-only memory (ROM), a random access memory (RAM), a magnetic disk, or an optical disc.

Figure 7:
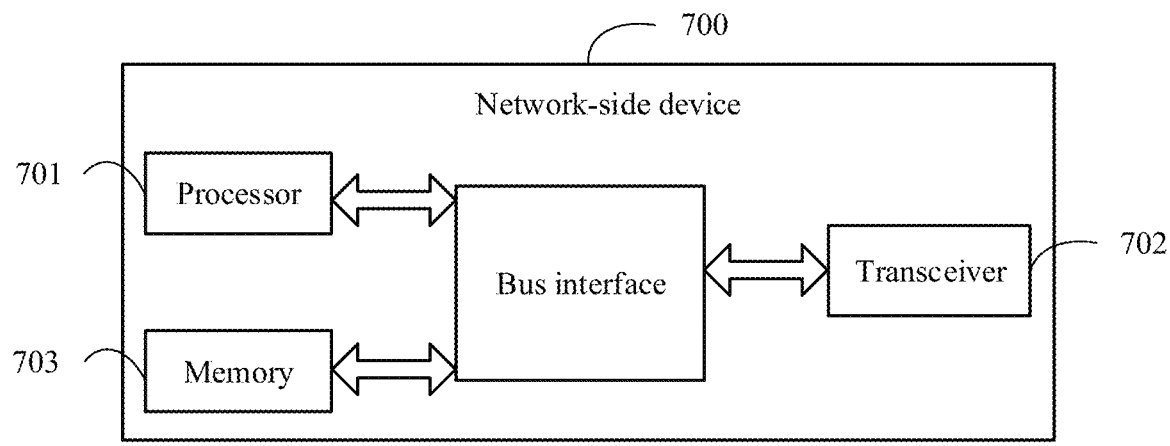
FIG. 7 is a structural block diagram of a network side device according to an embodiment of the present disclosure.

FIG. 7 is a structural diagram of a network side device according to an embodiment of the present disclosure, and the network side device is capable of implementing details of beam information determining described above, with the same effects achieved. As shown in FIG. 7, the network side device 700 includes a processor 701, a transceiver 702, a memory 703, and a bus interface.

The processor 701 is configured to read a program in the memory 703 and execute the following processes:

configuring a candidate beam information pool of a first set, where the first set includes at least one downlink channel and at least one uplink channel, or the first set includes at least one channel and at least one reference signal; and the candidate beam information pool includes at least one piece of candidate beam information; and determining, based on the candidate beam information pool, beam information of at least one of a first channel or a first reference signal that are included in the first set.

In FIG. 7, a bus architecture may include any quantity of interconnected buses and bridges, for interconnecting various circuits of one or more processors represented by the processor 701 and a memory represented by the memory 703. The bus architecture may further interconnect various other circuits such as a peripheral device, a voltage regulator, and a power management circuit. These are all well known in the art, and therefore are not described in this specification. The bus interface provides an interface. The transceiver 702 may be a plurality of components, that is, the transceiver 702 includes a transmitter and a receiver, and provides a unit for communicating with various other apparatuses on a transmission medium.

Optionally, in a case that the candidate beam information pool includes one piece of candidate beam information, the processor 701 is further configured to:
 determine, based on the one piece of candidate beam information included in the candidate beam information pool, the beam information of at least one of the first channel or the first reference signal that are included in the first set.

Optionally, in a case that the candidate beam information pool includes at least two pieces of candidate beam information, the processor 701 is further configured to:
 send first indication information for at least one of the first channel or the first reference signal that are included in the first set, where the first indication information is used to indicate one piece of candidate beam information in the candidate beam information pool; and
 determine the beam information of at least one of the first channel or the first reference signal based on the first indication information.

Optionally, a source reference signal of each piece of candidate beam information included in the candidate beam information pool is any one of an SSB, a CSI-RS, and an SRS.

Optionally, the processor 701 is configured to:
 configure or activate a common candidate beam information pool for each object in the first set; or
 configure or activate a candidate beam information pool of a first object in the first set; where other objects in the first set use the candidate beam information pool of the first object as a candidate beam information pool; where
 an object is at least one of a channel or a reference signal.

Optionally, the processor 701 is further configured to:
 determine, based on the beam information of at least one of the first channel or the first reference signal, beam information of at least one of a second channel or a second reference signal that are included in the first set.

Optionally, the processor 701 is configured to:
 determine the beam information of at least one of the second channel or the second reference signal based on an association relationship between at least one of the first channel or the first reference signal and at least one of the second channel or the second reference signal, and based on the beam information of at least one of the first channel or the first reference signal.

Optionally, the processor 701 is configured to:
 determine, based on the beam information of at least one of the first channel or the first reference signal, beam information of at least one of a second channel or a second reference signal that are scheduled by at least one of the first channel or the first reference signal.

Optionally, the processor 701 is further configured to:
 send second indication information for at least one of a third channel or a third reference signal that are included in the first set, where the second indication information is used to indicate one piece of candidate beam information in the candidate beam information pool; and
 in a case that an application time of the candidate beam information indicated by the first indication information is a latest application time, determine beam information of at least one of the first channel, the first reference signal, the third channel, or the third reference signal based on the candidate beam information indicated by the first indication information; or
 in a case that an application time of the candidate beam information indicated by the second indication information is a latest application time, determine beam information of at least one of the first channel, the first reference signal, the third channel, or the third reference signal based on the candidate beam information indicated by the second indication information.

Optionally, in a case that the first reference signal is an SRS, the processor 701 is configured to:
 send first downlink control information DCI, where the first DCI carries the first indication information.

Optionally, the first DCI includes an SRS request field, and the SRS request field carries the first indication information.

Optionally, in a case that the first channel is a PUSCH, the processor 701 is configured to:
 send second DCI, where the second DCI includes a CRI field or an SSBRI field, and the CRI field or the SSBRI field carries the first indication information; where
 the CRI field or the SSBRI field is associated with a target SRS resource.

Optionally, in a case that the PUSCH is a codebook-based PUSCH, the second DCI does not include an SRI field, or a length of the SRI field is zero bits; or
 in a case that the PUSCH is a non-codebook-based PUSCH, the second DCI includes an SRI field or a length of the SRI field is greater than zero bits; and the SRI field is used for CSI measurement.

Optionally, the processor 701 is further configured to:
 update, based on latest applicable candidate beam information indicated by indication information for any object in the first set, candidate beam information of an object included in the first set; or
 update, based on latest applicable candidate beam information indicated by indication information for a preset object in the first set, candidate beam information of an object included in the first set; where
 an object is at least one of a channel or a reference signal.

Figure 8:
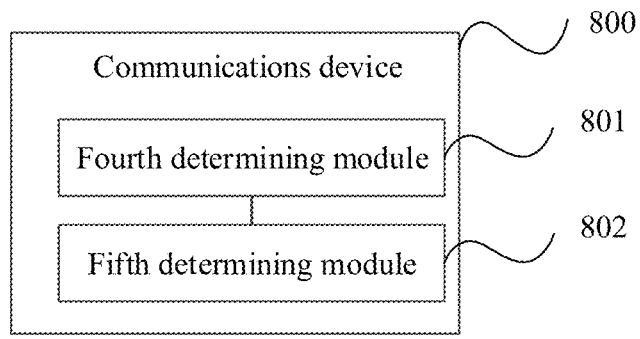
FIG. 8 is a schematic modular diagram of a communications device according to an embodiment of the present disclosure.

As shown in FIG. 8, an embodiment of the present disclosure further provides a communications device 800. The communications device may be a terminal or a network side device, including:
 a fourth determining module 801, configured to determine beam information of at least one of a fourth channel or a fourth reference signal; and
 a fifth determining module 802, configured to determine, based on the beam information of at least one of the fourth channel or the fourth reference signal, beam information of at least one of a fifth channel or a fifth reference signal.

Optionally, in a case that the fifth channel is a physical uplink control channel PUCCH, and the fourth channel is a physical downlink shared channel PDSCH, the fifth determining module 802 includes:
 a fifth determining unit, configured to determine beam information of the PUCCH based on TCI state information corresponding to a preset code point in a TCI field included in third DCI, where the TCI field is used to indicate beam information of the PDSCH.

Optionally, in a case that the TCI field corresponds to two or more pieces of TCI state information, the fifth determining unit is configured to:
  determine, based on the two or more pieces of TCI state information, beam information of PUCCHs pointing to two or more transmission and reception points TRPs, respectively; or
  determining, based on the two or more pieces of TCI state information, the beam information of the PUCCH corresponding to two or more TRP identifiers, respectively.

Optionally, in a case that the fifth channel is a PUCCH and the fourth channel is a PDCCH, the fifth determining module 802 includes:
  a sixth determining unit, configured to determine beam information of the PUCCH based on beam information of the PDCCH.

Optionally, in a case that the fifth channel is a PUCCH, if the PDCCH and the PDSCH correspond to different TRPs or TRP identifiers:
  the fifth determining module 802 includes:
  a seventh determining unit, configured to determine beam information of the PUCCH based on beam information of a higher-priority channel in the PDCCH and the PDSCH.

Optionally, in a case that the fifth reference signal is an SRS, the fourth channel is a PDSCH or a PUSCH.

It should be noted that the embodiment of the communications device is a communications device corresponding to the foregoing beam information determining method. All the implementations of the foregoing embodiment are applicable to the embodiment of the communications device, with the same technical effects achieved.

An embodiment of the present disclosure further provides a communications device, including a processor, a memory, and a computer program stored in the memory and executable on the processor. When the computer program is executed by the processor, the processes of the foregoing beam information determining method embodiment can be implemented, with the same technical effects achieved. To avoid repetition, details are not described herein again.

An embodiment of the present disclosure further provides a non-transitory computer-readable storage medium, where a computer program is stored in the non-transitory computer-readable storage medium. When the computer program is executed by a processor, the processes of the foregoing beam information determining method embodiment can be implemented, with the same technical effects achieved. To avoid repetition, details are not described herein again. The non-transitory computer-readable storage medium is, for example, a read-only memory (ROM), a random access memory (RAM), a magnetic disk, or an optical disc.

Figure 9:
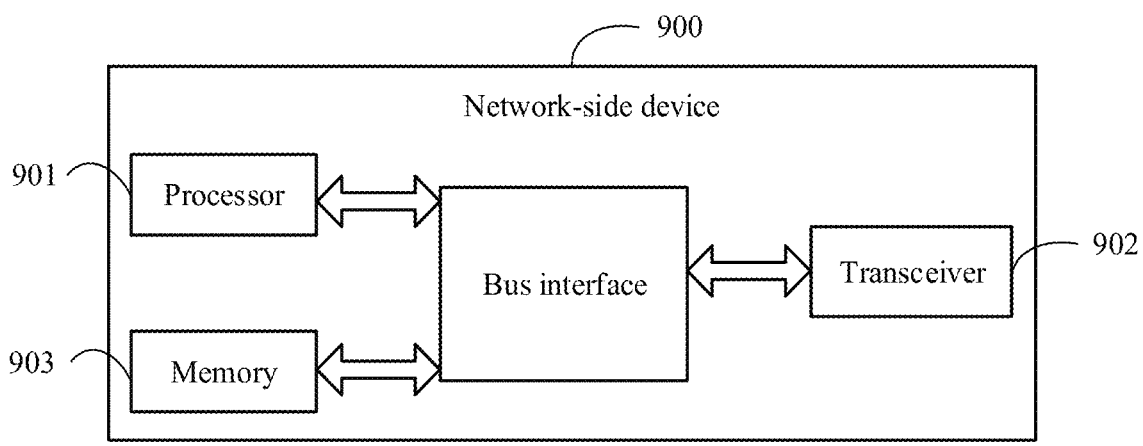
FIG. 9 is a structural block diagram of a communications device according to an embodiment of the present disclosure.

FIG. 9 is a structural diagram of a communications device being a network side device according to an embodiment of the present disclosure, and the communications device is capable of implementing details of beam information determining described above, with the same effects achieved. As shown in FIG. 9, the network side device 900 includes a processor 901, a transceiver 902, a memory 903, and a bus interface.

The processor 901 is configured to read a program in the memory 903 and execute the following processes:
  determining beam information of at least one of a fourth channel or a fourth reference signal; and
  determining, based on the beam information of at least one of the fourth channel or the fourth reference signal, beam information of at least one of a fifth channel or a fifth reference signal.

In FIG. 9, a bus architecture may include any quantity of interconnected buses and bridges, for interconnecting various circuits of one or more processors represented by the processor 901 and a memory represented by the memory 903. The bus architecture may further interconnect various other circuits such as a peripheral device, a voltage regulator, and a power management circuit. These are all well known in the art, and therefore are not described in this specification. The bus interface provides an interface. The transceiver 902 may be a plurality of components, that is, the transceiver 902 includes a transmitter and a receiver, and provides a unit for communicating with various other apparatuses on a transmission medium.

Optionally, in a case that the fifth channel is a physical uplink control channel PUCCH, and the fourth channel is a physical downlink shared channel PDSCH, the processor 901 is configured to:
  determine beam information of the PUCCH based on TCI state information corresponding to a preset code point in a TCI field included in third DCI, where the TCI field is used to indicate beam information of the PDSCH.

Optionally, in a case that the TCI field corresponds to two or more pieces of TCI state information, the processor 901 is configured to:
  determine, based on the two or more pieces of TCI state information, the beam information of PUCCHs pointing to two or more transmission and reception points TRPs, respectively; or
  determine, based on the two or more pieces of TCI state information, the beam information of the PUCCH corresponding to two or more TRP identifiers, respectively.

Optionally, in a case that the fifth channel is a PUCCH and the fourth channel is a PDCCH, the processor 901 is configured to:
  determine beam information of the PUCCH based on beam information of the PDCCH.

Optionally, in a case that the fifth channel is a PUCCH, if the PDCCH and the PDSCH correspond to different TRPs or TRP identifiers:
  the processor 901 is configured to:
  determine beam information of the PUCCH based on beam information of a higher-priority channel in the PDCCH and the PDSCH.

Optionally, in a case that the fifth reference signal is an SRS, the fourth channel is a PDSCH or a PUSCH.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present disclosure essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

Some embodiments of the present disclosure have been described with reference to the attached drawings; however, the present disclosure is not limited to the aforesaid embodiments, and these embodiments are merely illustrative but are not intended to limit the present disclosure. Persons of ordinary skill in the art may further derive many other implementations according to the teachings of the present disclosure and within the scope defined in the claims, and all of the implementations shall fall within the scope of the present disclosure.

What is claimed is:

1. A beam information determining method, performed by a terminal and comprising:
    determining a candidate beam information pool of a first set, wherein the first set comprises at least one downlink channel and at least one uplink channel, or the first set comprises at least one channel and at least one reference signal; and the candidate beam information pool comprises at least one piece of candidate beam information; and
    determining, based on the candidate beam information pool, beam information of at least one of a first channel or a first reference signal that are comprised in the first set; wherein
    in a case that the candidate beam information pool comprises at least two pieces of candidate beam information, the determining, based on the candidate beam information pool, beam information of the at least one of the first channel or the first reference signal that are comprised in the first set comprises:
        receiving first indication information for at least one of the first channel or the first reference signal that are comprised in the first set, the first indication information being used to indicate one piece of candidate beam information in the candidate beam information pool; and
        determining the beam information of the at least one of the first channel or the first reference signal based on the first indication information;
    wherein the method further comprises:
    receiving second indication information for at least one of a third channel or a third reference signal that are comprised in the first set, the second indication information being used to indicate one piece of candidate beam information in the candidate beam information pool;
    in a case that an application time of the candidate beam information indicated by the first indication information is a latest application time, determining the beam information of the at least one of the first channel or the first reference signal based on the candidate beam information indicated by the first indication information; and
    in a case that the application time of the candidate beam information indicated by the second indication information is the latest application time, determining beam information of at least one of the third channel or the third reference signal based on the candidate beam information indicated by the second indication information.

2. The beam information determining method according to claim 1, wherein in a case that the candidate beam information pool comprises one piece of candidate beam information, the determining, based on the candidate beam information pool, beam information of at least one of the first channel or the first reference signal that are comprised in the first set comprises:
    determining, based on the one piece of candidate beam information comprised in the candidate beam information pool, the beam information of at least one of the first channel or the first reference signal that are comprised in the first set.

3. The beam information determining method according to claim 1, wherein the determining the candidate beam information pool of the first set comprises:
    determining the candidate beam information pool of the first set based on a candidate beam information pool configured or activated by the network side device for a first object in the first set, wherein other objects in the first set use the candidate beam information pool of the first object as a candidate beam information pool; wherein
    an object is at least one of a channel or a reference signal.

4. The beam information determining method according to claim 1, further comprising:
    determining, based on the beam information of at least one of the first channel or the first reference signal, beam information of at least one of a second channel or a second reference signal that are comprised in the first set.

5. The beam information determining method according to claim 4, wherein the determining, based on the beam information of at least one of the first channel or the first reference signal, beam information of at least one of the second channel or the second reference signal that are comprised in the first set comprises:
    determining, based on the beam information of at least one of the first channel or the first reference signal, beam information of at least one of the second channel or the second reference signal that are scheduled by at least one of the first channel or the first reference signal.

6. The beam information determining method according to claim 1, wherein the method further comprises:
    updating, based on latest applicable candidate beam information indicated by indication information for any object in the first set, candidate beam information of an object comprised in the first set; or
    updating, based on latest applicable candidate beam information indicated by indication information for a preset object in the first set, candidate beam information of an object comprised in the first set; wherein
    an object is at least one of a channel or a reference signal.

7. The beam information determining method according to claim 1, wherein a source reference signal of each piece of candidate beam information comprised in the candidate beam information pool is any one of a synchronization signal block (SSB), a channel state information reference signal (CSI-RS), and a channel sounding reference signal (SRS).

8. A terminal, comprising a memory, a processor, and a computer program stored in the memory and executable on the processor, wherein the computer program, when executed by the processor, causes the terminal to perform:
- determining a candidate beam information pool of a first set, wherein the first set comprises at least one downlink channel and at least one uplink channel, or the first set comprises at least one channel and at least one reference signal; and the candidate beam information pool comprises at least one piece of candidate beam information; and
- determining, based on the candidate beam information pool, beam information of at least one of a first channel or a first reference signal that are comprised in the first set; wherein
- in a case that the candidate beam information pool comprises at least two pieces of candidate beam information, the computer program, when executed by the processor, causes the terminal to perform:
  - receiving first indication information for at least one of the first channel or the first reference signal that are comprised in the first set, the first indication information being used to indicate one piece of candidate beam information in the candidate beam information pool;
  - determining the beam information of the at least one of the first channel or the first reference signal based on the first indication information;
  - receiving second indication information for at least one of a third channel or a third reference signal that are comprised in the first set, the second indication information being used to indicate one piece of candidate beam information in the candidate beam information pool;
  - in a case that an application time of the candidate beam information indicated by the first indication information is a latest application time, determining beam information of the at least one of the first channel or the first reference signal based on the candidate beam information indicated by the first indication information; and
  - in a case that the application time of the candidate beam information indicated by the second indication information is the latest application time, determining beam information of at least one of the third channel or the third reference signal based on the candidate beam information indicated by the second indication information.

9. The terminal according to claim 8, wherein the computer program, when executed by the processor, causes the terminal to perform:
- determining the candidate beam information pool of the first set based on a candidate beam information pool configured or activated by the network side device for a first object in the first set, wherein other objects in the first set use the candidate beam information pool of the first object as a candidate beam information pool; wherein
- an object is at least one of a channel or a reference signal.

10. The terminal according to claim 8, wherein the computer program, when executed by the processor, causes the terminal to perform:
- determining, based on the beam information of at least one of the first channel or the first reference signal, beam information of at least one of a second channel or a second reference signal that are scheduled by at least one of the first channel or the first reference signal.

11. The terminal according to claim 8, wherein the computer program, when executed by the processor, causes the terminal to perform:
- updating, based on latest applicable candidate beam information indicated by indication information for any object in the first set, candidate beam information of an object comprised in the first set; or
- updating, based on latest applicable candidate beam information indicated by indication information for a preset object in the first set, candidate beam information of an object comprised in the first set; wherein
- an object is at least one of a channel or a reference signal.

12. The terminal according to claim 8, wherein in a case that the candidate beam information pool comprises one piece of candidate beam information, the computer program, when executed by the processor, causes the terminal to perform:
- determining, based on the one piece of candidate beam information comprised in the candidate beam information pool, the beam information of the at least one of the first channel or the first reference signal that are comprised in the first set.

13. The terminal according to claim 10, wherein the computer program, when executed by the processor, causes the terminal to perform:
- determining, based on the beam information of at least one of the first channel or the first reference signal, beam information of at least one of the second channel or the second reference signal that are scheduled by at least one of the first channel or the first reference signal.

14. The terminal according to claim 8, wherein a source reference signal of each piece of candidate beam information comprised in the candidate beam information pool is any one of a synchronization signal block (SSB), a channel state information reference signal (CSI-RS), and a channel sounding reference signal (SRS).

15. A non-transitory computer-readable storage medium, storing a computer program, wherein the computer program, when executed by a processor of a terminal, causes the terminal to perform:
- determining a candidate beam information pool of a first set, wherein the first set comprises at least one downlink channel and at least one uplink channel, or the first set comprises at least one channel and at least one reference signal, and the candidate beam information pool comprises at least one piece of candidate beam information; and
- determining, based on the candidate beam information pool, beam information of at least one of a first channel or a first reference signal that are comprised in the first set; wherein
- in a case that the candidate beam information pool comprises at least two pieces of candidate beam information, the computer program, when executed by the processor, causes the terminal to perform:
  - receiving first indication information for at least one of the first channel or the first reference signal that are comprised in the first set, the first indication information being used to indicate one piece of candidate beam information in the candidate beam information pool;
  - determining the beam information of the at least one of the first channel or the first reference signal based on the first indication information;
  - receiving second indication information for at least one of a third channel or a third reference signal that are comprised in the first set, wherein the second indication information is used to indicate one piece of candidate beam information in the candidate beam information pool;

in a case that an application time of the candidate beam information indicated by the first indication information is a latest application time, determining beam information of at least one of the first channel or the first reference signal based on the candidate beam information indicated by the first indication information; and in a case that the application time of the candidate beam information indicated by the second indication information is the latest application time, determining beam information of at least one of the third channel or the third reference signal based on the candidate beam information indicated by the second indication information.

16. The non-transitory computer-readable storage medium according to claim 15, wherein the computer program, when executed by the processor, causes the terminal to perform:

determining the candidate beam information pool of the first set based on a candidate beam information pool configured or activated by the network side device for a first object in the first set, wherein other objects in the first set use the candidate beam information pool of the first object as a candidate beam information pool; wherein an object is at least one of a channel or a reference signal.

17. The non-transitory computer-readable storage medium according to claim 15, wherein the computer program, when executed by the processor, causes the terminal to perform:

determining, based on the beam information of at least one of the first channel or the first reference signal, beam information of at least one of a second channel or a second reference signal that are scheduled by at least one of the first channel or the first reference signal.

18. The non-transitory computer-readable storage medium according to claim 15, wherein the computer program, when executed by the processor, causes the terminal to perform:

updating, based on latest applicable candidate beam information indicated by indication information for any object in the first set, candidate beam information of an object comprised in the first set; or updating, based on latest applicable candidate beam information indicated by indication information for a preset object in the first set, candidate beam information of an object comprised in the first set; wherein an object is at least one of a channel or a reference signal.

19. The non-transitory computer-readable storage medium according to claim 15, wherein in a case that the candidate beam information pool comprises one piece of candidate beam information, the computer program, when executed by the processor, causes the terminal to perform:

determining, based on the one piece of candidate beam information comprised in the candidate beam information pool, the beam information of at least one of the first channel or the first reference signal that are comprised in the first set.

20. The non-transitory computer-readable storage medium according to claim 15, wherein a source reference signal of each piece of candidate beam information comprised in the candidate beam information pool is any one of a synchronization signal block (SSB), a channel state information reference signal (CSI-RS), and a channel sounding reference signal (SRS).

* * * * *